United States Patent
Lee et al.

(10) Patent No.: US 11,496,068 B2
(45) Date of Patent: Nov. 8, 2022

(54) ENERGY HARVESTING APPARATUS USING TRIBOELECTRIFICATION

(71) Applicant: CHUNGANG UNIVERSITY INDUSTRY-ACADEMIC COOPERATION FOUNDATION, Seoul (KR)

(72) Inventors: Sang Min Lee, Gwangmyeong-si (KR); Ji Hoon Chung, Seoul (KR); Su Kyung Lee, Seoul (KR); Hak Seong Moon, Daegu (KR); Hyung Seok Yong, Goyang-si (KR); Tae Hun Kim, Daegu (KR); Ban Seok Kim, Incheon (KR)

(73) Assignee: CHUNGANG UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 595 days.

(21) Appl. No.: 15/563,103

(22) PCT Filed: Oct. 27, 2016

(86) PCT No.: PCT/KR2016/012187
§ 371 (c)(1),
(2) Date: Sep. 29, 2017

(87) PCT Pub. No.: WO2017/074073
PCT Pub. Date: May 4, 2017

(65) Prior Publication Data
US 2018/0083552 A1  Mar. 22, 2018

(30) Foreign Application Priority Data
Oct. 27, 2015  (KR) .................. 10-2015-0149671

(51) Int. Cl.
*H02N 1/04*  (2006.01)

(52) U.S. Cl.
CPC .................................... *H02N 1/04* (2013.01)

(58) Field of Classification Search
CPC ........................... H02N 1/04; G03G 15/0216
(Continued)

(56) References Cited

U.S. PATENT DOCUMENTS

| | | | | |
|---|---|---|---|---|
| 7,599,652 B2 * | 10/2009 | Takagami | ............ | G03G 15/657 399/398 |
| 2003/0030699 A1 * | 2/2003 | Matsuo | .............. | G03G 15/0291 347/53 |

(Continued)

FOREIGN PATENT DOCUMENTS

| | | |
|---|---|---|
| CN | 104901581 A | 9/2015 |
| EP | 0 366 591 A1 | 5/1990 |

(Continued)

OTHER PUBLICATIONS

International Search Report for PCT/KR2016/012187 dated Feb. 20, 2017 [PCT/ISA/210].

(Continued)

*Primary Examiner* — Gary A Nash
(74) *Attorney, Agent, or Firm* — Sughrue Mion, PLLC

(57) ABSTRACT

The present invention relates to an energy harvesting apparatus using triboelectrification. The energy harvesting apparatus of the present invention may include: a housing formed in an accommodation space in the energy harvesting apparatus; an electrification sheet accommodated to be rolled into the housing; an elastic body provided in the housing and providing elastic force so that the electrification sheet is rolled into the housing; and an electrode unit provided on the electrification sheet or on the periphery of the electrification sheet and electrificating the electrification sheet through friction while the electrification sheet is pulled or rolled.

8 Claims, 13 Drawing Sheets

(58) Field of Classification Search
USPC .................................................. 310/309–310
See application file for complete search history.

(56) References Cited

U.S. PATENT DOCUMENTS

| | | | |
|---|---|---|---|
| 2014/0338458 A1* | 11/2014 | Wang | G01H 11/06 73/658 |
| 2015/0035408 A1* | 2/2015 | Despesse | H02N 1/08 310/310 |
| 2016/0139532 A1* | 5/2016 | Fukuda | G03G 15/0291 399/170 |
| 2017/0237365 A1* | 8/2017 | Kwon | D03D 15/67 310/310 |

FOREIGN PATENT DOCUMENTS

| | | |
|---|---|---|
| KR | 10-2002-0050318 A | 6/2002 |
| KR | 10-2013-0038045 A | 4/2013 |

OTHER PUBLICATIONS

Written Opinion for PCT/KR2016/012187 dated Feb. 20, 2017 [PCT/ISA/237].

* cited by examiner (a)

(b)

(d)

(c)

ENERGY HARVESTING APPARATUS USING TRIBOELECTRIFICATION

CROSS REFERENCE TO RELATED APPLICATIONS

This application is a National Stage of International Application No. PCT/KR2016/012187 filed Oct. 27, 2016, claiming priority based on Korean Patent Application No. 10-2015-0149671 filed Oct. 27, 2015, the contents of all of which are incorporated herein by reference in their entirety.

TECHNICAL FIELD

The present invention relates to an energy harvesting apparatus using triboelectrification, and more particularly, to an energy harvesting apparatus using triboelectrification, and more particularly, to an energy harvesting apparatus using triboelectrification, which has a structure in which since multiple outputs can be generated by generating triboelectrification depending on vertical contact, separation, sliding, and overlapping with one input, maximize triboelectrification efficiency can be maximized.

BACKGROUND ART

As the use of fossil energy including coal, oil, and the like increases, the fossil fuels is expected to be exhausted due to the rapid increase of an energy demand through the introduction of various technologies. Securing of future energy resources and development of environmentally friendly energy depending on energy depletion and environmental problems caused due to the use of a lot of fossil energy are on the rise as major tasks worldwide.

Energy harvesting technology, which is one of representative clean energy systems that can draw energy that is thrown away from a surrounding environment in such a background, has gotten popular recently. The structure and performance of energy harvesting are also increasing depending on the type of energy that can be harvested in the vicinity, such as harvesting light energy, energy harvesting by electromagnetic field change, and energy harvesting by triboelectricity.

A power generation scheme of an energy harvesting apparatus in the related art includes various methods including a vertical contact and separation scheme, a sliding scheme, an overlapping scheme, and the like and a scheme that acquires one output by one input is used, but such a scheme has a limit in increasing triboelectrification efficiency.

DISCLOSURE

Technical Problem

The present invention provides an energy harvesting apparatus using triboelectrification, and more particularly, to an energy harvesting apparatus using triboelectrification, which has a structure in which since multiple outputs can be generated by generating triboelectrification depending on vertical contact, separation, sliding, and overlapping with one input, maximize triboelectrification efficiency can be maximized.

Technical Solution

According to an embodiment of the present invention, an energy harvesting apparatus using triboelectrification by the present invention may include: a housing formed in an accommodation space in the energy harvesting apparatus; an electrification sheet accommodated to be rolled into the housing; an elastic body provided in the housing and providing elastic force so that the electrification sheet is rolled into the housing; and an electrode unit provided on the electrification sheet or on the periphery of the electrification sheet and electrificating the electrification sheet through friction while the electrification sheet is pulled or rolled.

The housing may be formed in a cylindrical shape and have a rotary shaft to which a rear end of the electrification sheet is connected at the center thereof.

An opening for moving the electrification sheet to the inside and the outside of the housing may be formed at one side of the housing.

A grip portion having a larger thickness than the electrification sheet may be formed at a fore end of the electrification sheet.

The electrification sheet may be accommodated while being rolled to form multiple layers in the rotary shaft.

The electrification sheet may be made of a Teflon material.

The electrode unit may be provided on an inner wall of the housing.

The electrode unit may be provided on an outer surface of the rotary shaft.

The electrode unit may be formed with a pattern in the electrification sheet.

The electrode unit may be provided on the inner wall of the housing and the outer surface of the rotary shaft.

Advantageous Effects

According to an embodiment of the present invention, since multiple outputs can be generated by generating triboelectrification depending on vertical contact, separation, sliding, and overlapping with one input, maximize triboelectrification efficiency can be maximized.

BEST MODE

Figure 1:
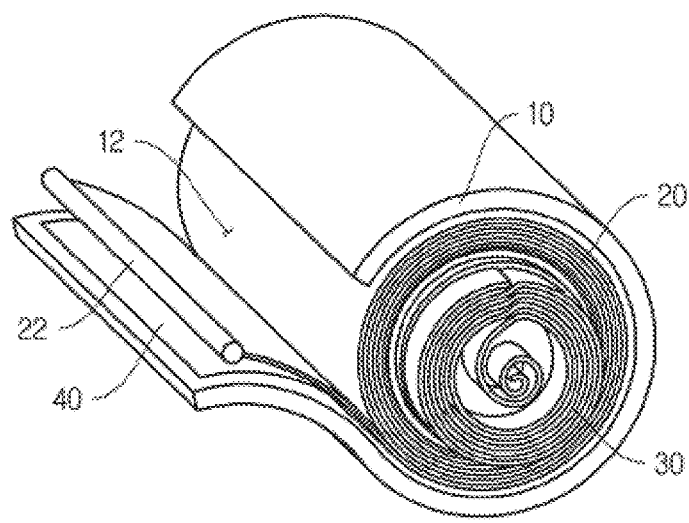
FIG. 1 is a perspective view of an energy harvesting apparatus using triboelectrification according to an embodiment of the present invention.

The present invention may have various modifications and various embodiments and specific embodiments will be illustrated in the drawings and described in detail. However, this does not limit the present invention within specific embodiments, and it should be understood that the present invention covers all the modifications, equivalents and replacements within the idea and technical scope of the present invention. In describing the present invention, a detailed description of related known technologies will be omitted if it is determined that they make the gist of the present invention unclear.

Terms including as first, second, and the like are used for describing various constituent elements, but the constituent elements are not limited by the terms. The terms are used only to discriminate one constituent element from another component.

Terms used in the present application are used only to describe specific exemplary embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Hereinafter, an embodiment of an energy harvesting apparatus using triboelectrification according to the present invention will be described in detail with reference to the accompanying drawings and in describing the embodiment with reference to the accompanying drawings, like reference numerals refer to like or corresponding elements and a duplicated description thereof will be omitted.

Figure 2:
FIG. 2 is an example diagram illustrating that triboelectric energy is harvested by a vertical contact and separation scheme.
Figure 2:
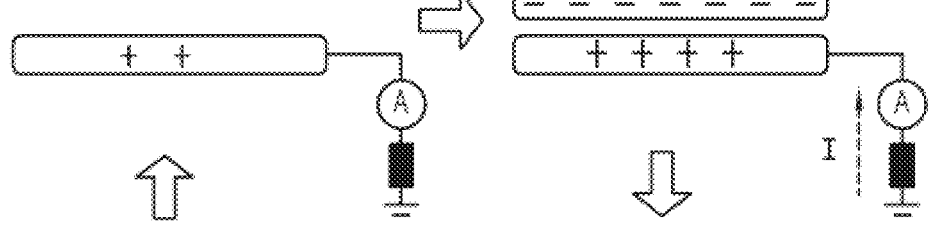
Figure 2:
Figure 2:
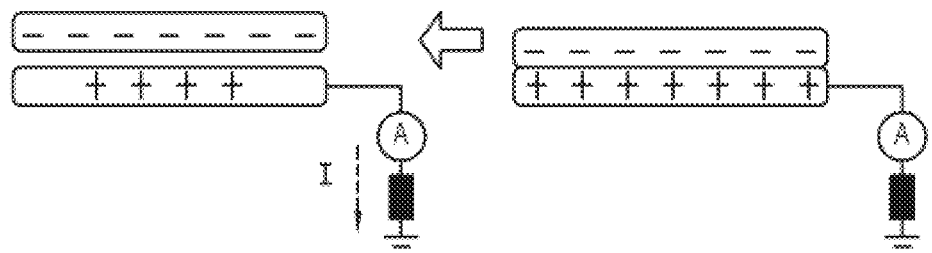
Figure 3:
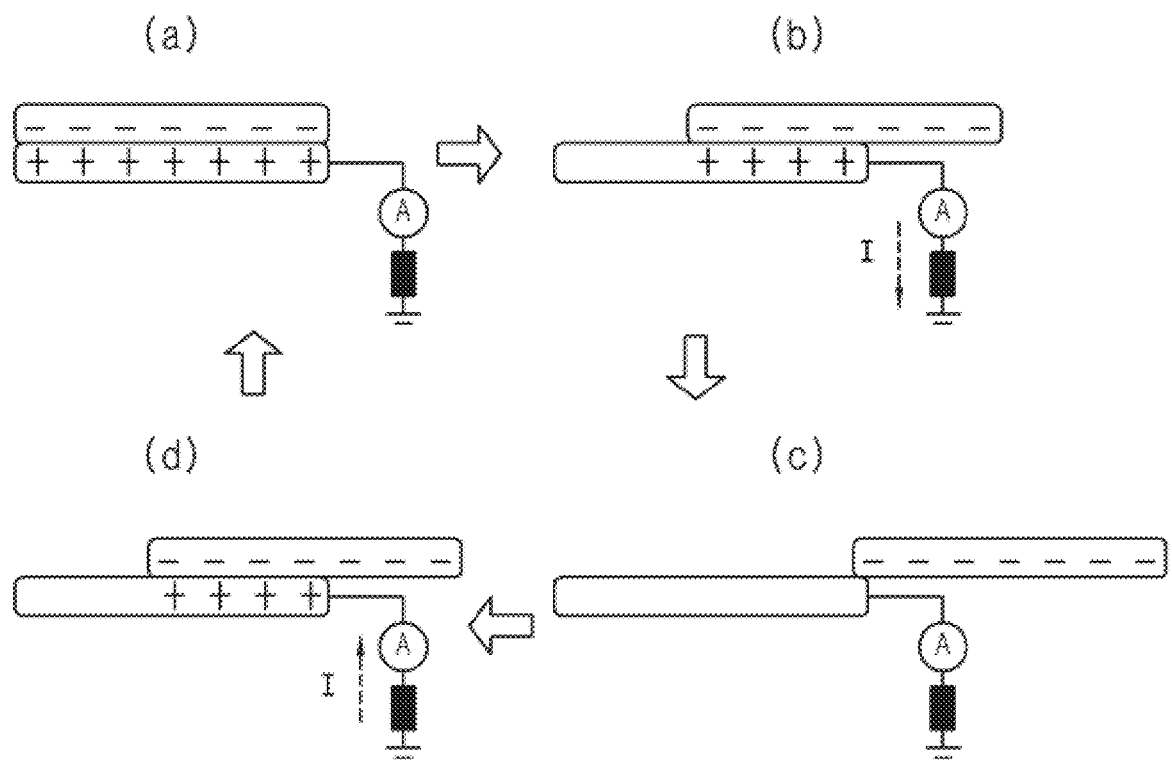
FIG. 3 is an example diagram illustrating that triboelectric energy is harvested by a vertical contact and separation scheme.
Figure 4:
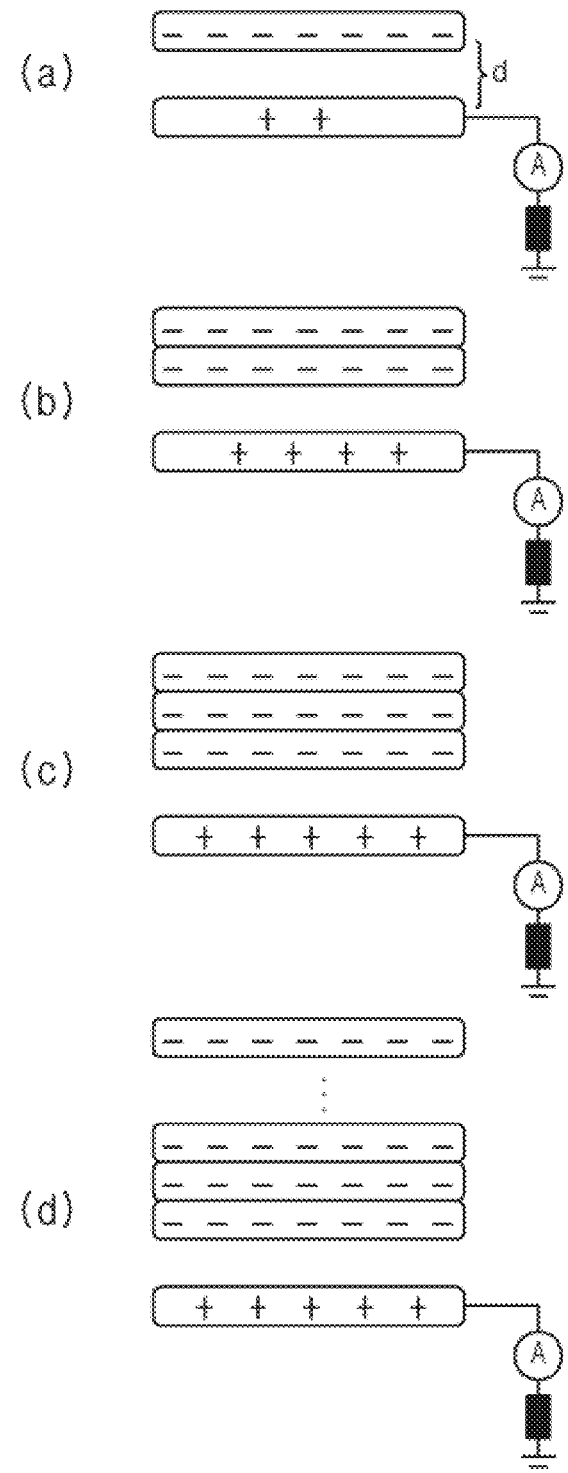
FIG. 4 is an example diagram illustrating that the triboelectric energy is harvested by an overlapping scheme.

FIG. 1 is a perspective view of an energy harvesting apparatus using triboelectrification according to an embodiment of the present invention, FIG. 2 is an example diagram illustrating that triboelectric energy is harvested by a vertical contact and separation scheme, FIG. 3 is an example diagram illustrating that triboelectric energy is harvested by a vertical contact and separation scheme, and FIG. 4 is an example diagram illustrating that the triboelectric energy is harvested by an overlapping scheme.

As illustrated above, the energy harvesting apparatus using triboelectrification according to the present invention may include: a housing 10 formed in an accommodation space therein; an electrification sheet 20 accommodated to be rolled in the housing 10; an elastic body 30 provided in the housing 10 and providing elastic force to roll the electrification sheet 20; and an electrode unit 40 provided on the electrification sheet 20 or on the periphery of the electrification sheet 20 and electrificating the electrification sheet 20 through friction while the electrification sheet 20 is pulled or rolled.

The housing 10 which forms an outer shape of the triboelectrification harvesting apparatus may be in a hollow cylindrical shape as illustrated in FIG. 1. This just presents one example of the housing 10 and the housing 10 may have not the cylindrical shape but various shapes including a quadrangular shape, and the like and the housing 10 may be made by all shapes in which the electrification sheet 20 may be rolled into the internal accommodation space.

An opening 12 for the electrification sheet 20 to move to the inside and the outside of the housing 10 is formed at one side of the housing 10. The opening 12 is formed in a shape in which a part of a hollow cylindrical wall is cut and the electrification sheet 20 passes through the opening 12 while being pulled or rolled.

The electrification sheet 20 serves to harvest electric energy by triboelectrification with the electrode unit 40 while being pulled or rolled. The electrification sheet 20 may adopt a material which is easily electrificated to a negative (−) pole and may be made of, for example, a Teflon material. Besides, the electrification sheet 20 may be made of materials including polydimethysiloxane (PDMS), polyvinyl chloride (PVC), polyimide, and the like which are easily electrificated to the negative (−) pole.

As the electrification sheet 20, all sheets of a material to be well rolled into the housing 10 may be used as described above and a rear end (an end position at an innermost side) of the electrification sheet 20 is connected to a rotary shaft 14 provided at the center in the housing 10. Therefore, the electrification sheet 20 is wound on the rotary shaft 14 while being rolled by the elastic force of the elastic body 30.

Meanwhile, a grip portion 22 having a larger thickness than the electrification sheet 20 is formed at a fore end (an end positioned at an outermost side) of the electrification sheet 20 so as to well pull the electrification sheet 20. The grip portion 22 may have various shapes including a circular shape, the quadrangular shape, and the like when being viewed from a cross section.

The elastic body 30 is provided on the rotary shaft 14 to serve to provide the elastic force so that the electrification sheet 20 is rolled into the housing 10. When a user pulls the electrification sheet 20 to the outside the housing 10, the elastic body 30 stores elastic energy and provides the elastic force so that the electrification sheet 20 is rolled into the housing 10 when the electrification sheet 20 is released. In this case, the electrification sheet 20 generates the electric energy through the triboelectrification with the electrode unit 40. A scheme in which the electrification sheet 20 performs the triboelectrification with the electrode unit 40 will be described below in more detail. In the embodiment, the elastic body 30 adopts a clockwork spring and may adopt all elastic bodies which may apply the elastic force to the electrification sheet 20.

The electrode unit 40 is provided on an inner wall of the housing 10. The electrode unit 40 serves to harvest the electric energy through the triboelectrification with the electrification sheet 10. The electrode unit 40 is provided on the inner wall of the housing 10 to be adjacent to a part to which the electrification sheet 20 moves and a slight interval exists between the electrification sheet 20 and the electrode unit 40, and as a result, the electrification sheet 20 repeats vertical contact with and separation from the electrode unit 40 while being rolled.

Hereinafter, it will be described that the energy harvesting apparatus using the triboelectrification according to the present invention harvests triboelectric energy with reference to FIGS. 2 to 4.

Referring to FIG. 2 (vertical contact and separation scheme), as illustrated in FIG. 2(a), when the electrification sheet 20 is close to the electrode unit 40, the electrode unit 40 shows a positive (+) pole which is opposite polarity to the electrification sheet 20 by an electrostatic induction phenomenon. In this case, as illustrated in FIG. 2(b), electrons move between the electrode unit 40 and a ground, and as a result, current is generated. Thereafter, when the electrification sheet 20 and the electrode unit 40 contact each other, the electrification sheet 20 and the electrode unit 40 maintain an equivalent state as illustrated in FIG. 2(c) and when the electrification sheet 20 and the electrode unit 40 are distant from each other as illustrated in FIG. 2(d), the current is generated as the electrons move between the electrode unit 40 and the ground in an opposite direction to the contact in order for the electrode unit 40 to return to the equivalent state again.

The vertical contact and separation scheme described above may be generated by fluttering and hitting the electrode unit 40 by strong elastic force while the electrification sheet 20 is rolled into the housing 10.

Referring to FIG. 3 (sliding scheme), the sliding scheme is based on the same principle as the vertical contact and separation scheme, but the sliding scheme is different from the vertical contact and separation scheme in that a dimensional change between the electrification sheet 20 and the electrode unit 40 occurs in not a vertical direction but a horizontal direction. That is, when the electrification sheet 20 contacts the electrode unit 40 with the maximum dimension as illustrated in FIG. 3(c), the surface of the electrode unit 40 shows the opposite polarity to the electrification sheet 20. Thereafter, when the contact dimension with the electrode unit 40 is changed while the electrification sheet 20 moves in the horizontal direction, a range of the electrostatic induction effect is changed, and as a result, the current is generated between the electrode unit 40 and the ground through the electron movement in order to maintain the equivalent state in the electrode unit 40.

Next, when the electrification sheet 20 is completely separated to a range in which the electrification sheet 20 does not influence the electrode unit 40, the surface of the electrode unit 40 maintains a state in which there is no electrificated charge. Thereafter, when the electrification sheet 20 moves in the horizontal direction again and the contact dimension with the electrode unit 40 thus increases, the current is generated in the opposite direction from the ground through the movement of the electrons in order for the electrode unit 40 to show the opposite polarity.

The sliding scheme described above may occur while the electrification sheet 20 sweeps the electrode unit 40 with a predetermined distance during a process in which the electrification sheet 20 is rolled while being fluttered.

Referring to FIG. 4 (overlapping scheme), in the overlapping scheme, the electric energy is harvested at a different principle from the vertical contact and separation scheme and the sliding scheme. In the overlapping scheme, the influence range and degree of the electrostatic induction phenomenon gradually increases by an increase in quantity of electrificated charges due to the influence of overlapping in which the electrification sheets 20 are stacked in multiple layers, and as a result, the current is generated due to a difference in charge electrificated onto the surface of the electrode unit 40. In the case of FIGS. 4(a), 4(b), and 4(c), the quantity of charges electrificated onto the electrode unit 40 is changed due to the influence of the overlapping in which the electrification sheets 20 are stacked one layer by one layer at a predetermined distance. When electrification sheets 20 which are sufficiently electrificated are stacked, the degree of the electrostatic induction effect increases, and as a result, the current is generated between the electrode unit 40 and the ground through the electron movement according to the change in potential difference.

Thereafter, when the number of stacked electrification sheets 20 of a predetermined degree or more increases as illustrated in FIG. 4(d), a degree in which the influence depending on the polarity of the stacked electrification sheet 20 is exerted onto up to the surface of the electrode unit 40 becomes insignificant, and as a result, the quantity of charges electrificated to the electrode unit 40 is converged.

The overlapping scheme described above may occur by the electrification sheets 20 which overlap with each other in multiple layers when viewed in the cross section while the electrification sheet 20 is rolled.

Since the energy harvesting apparatus using the triboelectrifiation according to the present invention may generate three power generation schemes by one input (pulling), the energy harvesting apparatus may product multiple outputs and components required for the triboelectrification are appropriately arranged in the housing 10 to show excellent spatial utilization.

Next, hereinafter, another embodiment of the energy harvesting apparatus using triboelectrification according to the present invention will be described.

Figure 5:
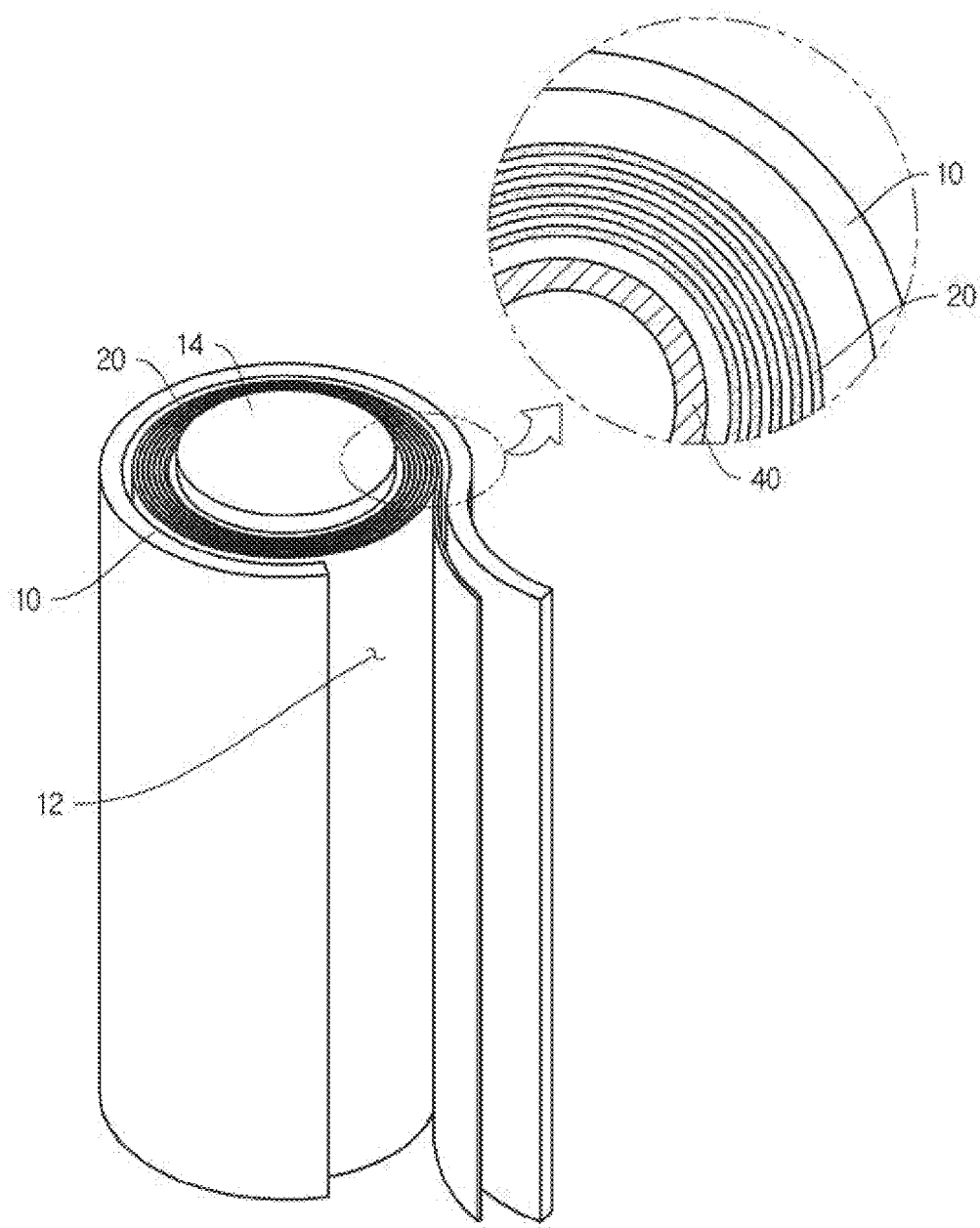
FIG. 5 is a perspective view of an energy harvesting apparatus using triboelectrification according to another embodiment of the present invention.
Figure 6:
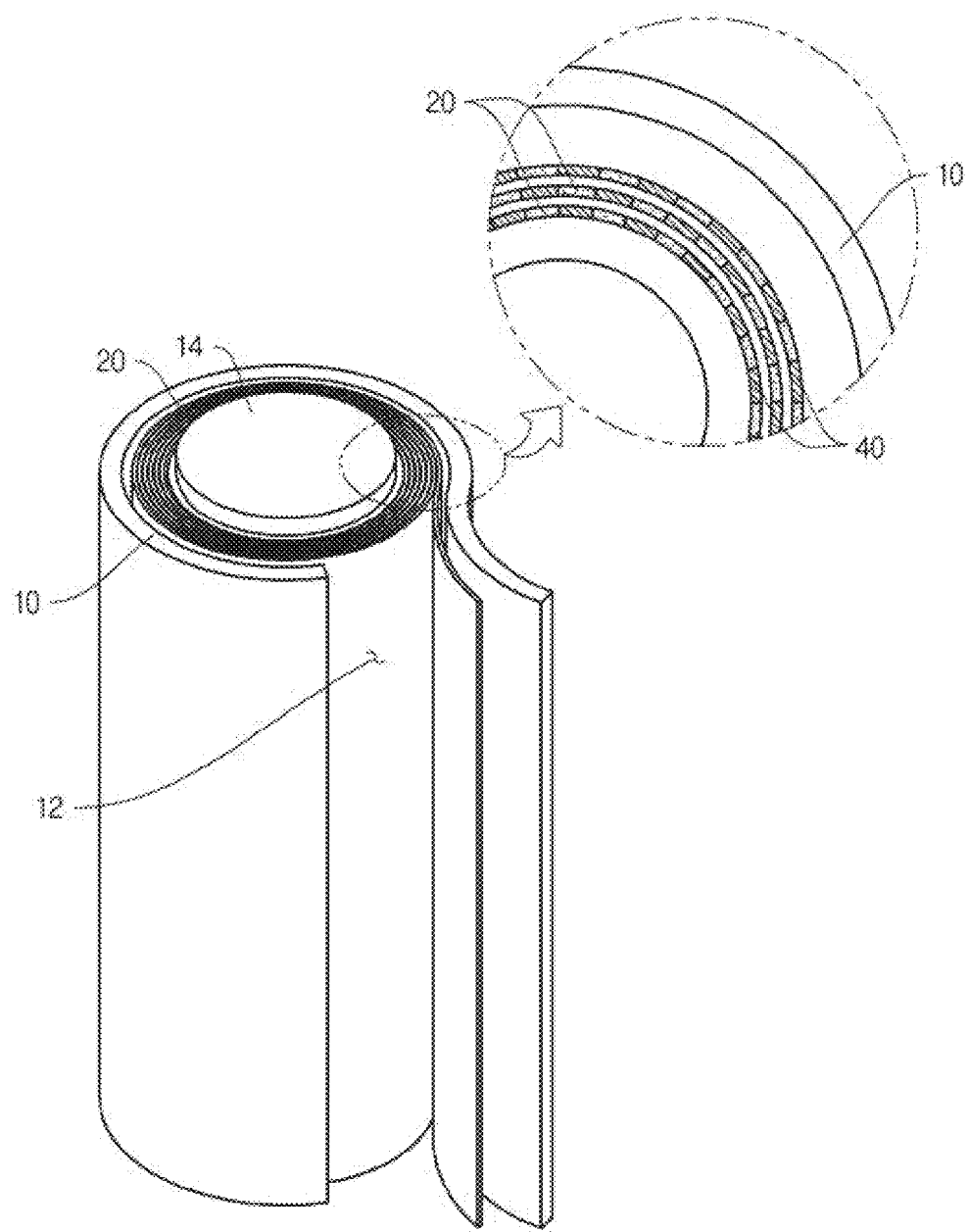
FIG. 6 is a perspective view of an energy harvesting apparatus using triboelectrification according to yet another embodiment of the present invention.
Figure 7:
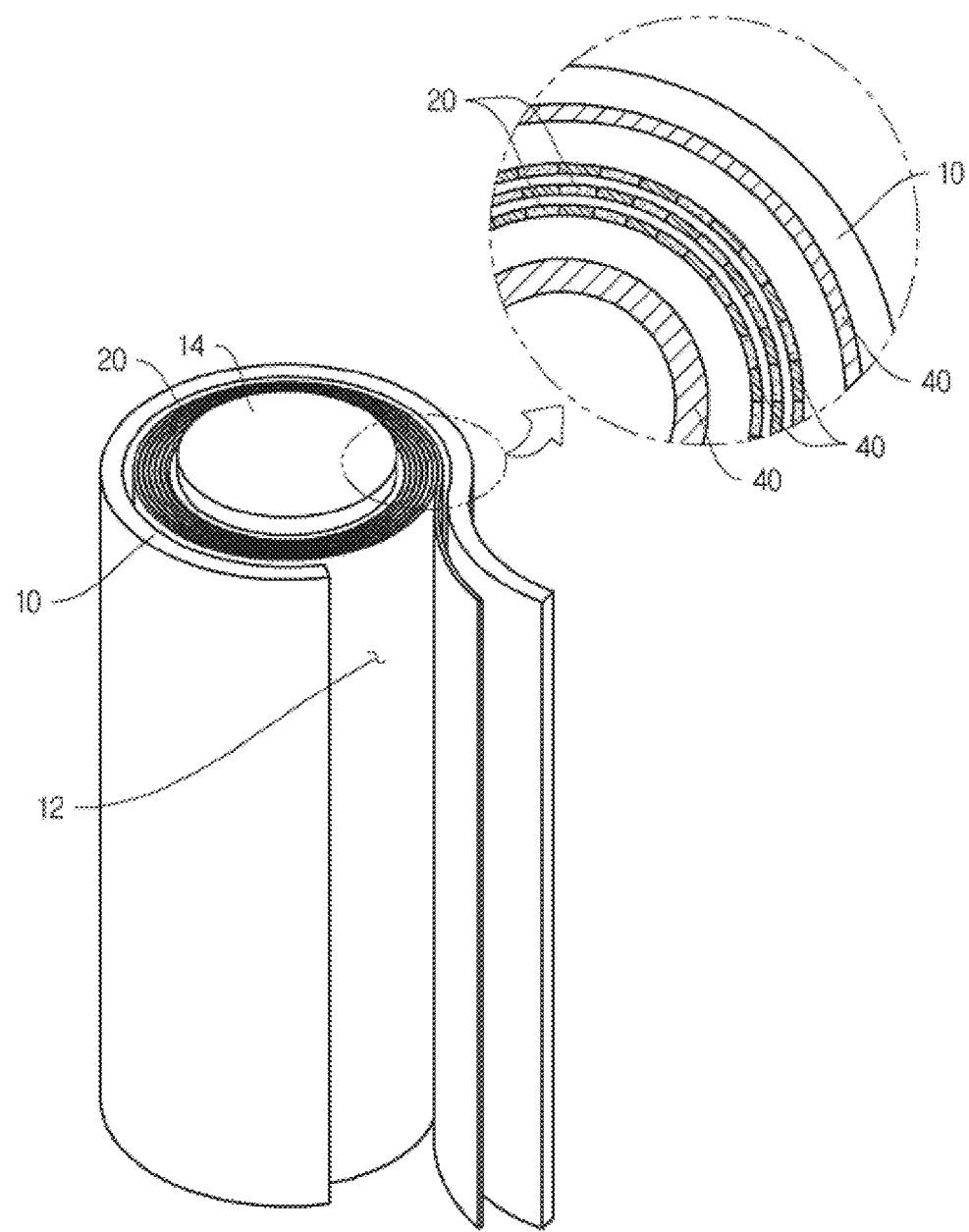
FIG. 7 is a perspective view of an energy harvesting apparatus using triboelectrification according to still yet another embodiment of the present invention.

FIG. 5 is a perspective view of an energy harvesting apparatus using triboelectrification according to another embodiment of the present invention, FIG. 6 is a perspective view of an energy harvesting apparatus using triboelectrification according to yet another embodiment of the present invention, and FIG. 7 is a perspective view of an energy harvesting apparatus using triboelectrification according to still yet another embodiment of the present invention.

The embodiments illustrates in FIGS. 5 to 7 have almost similar configurations to the embodiment illustrated in FIG. 1, but the embodiments illustrates in FIGS. 5 to 7 are different from the embodiment illustrated in FIG. 1 in the location of the electrode unit 40, the configuration of the electrification sheet 20, and the like.

First, referring to FIG. 5, the electrode unit 40 is provided on not the inner wall of the housing 10 but an outer surface of the rotary shaft 14. According to such a structure, the electrification sheet 20 contacts the electrode unit 40 while the electrification sheet 20 is rolled into the electrode unit 40 and in particular, the electric energy is generated through the overlapping scheme.

Referring to FIG. 6, a shape in which the electrode unit 40 is patterned in the electrification sheet 20 is provided. According to such a structure, while the electrification sheet 20 is rolled into the electrode unit 40, the vertical contact and separation scheme with each electrode unit 40, the sliding scheme, and the overlapping scheme are simultaneously actuated, and as a result, the electric energy is generated by the multiple outputs.

Referring to FIG. 7, the energy harvesting apparatus includes all types of structures described above. That is, the electrode unit 40 is provided on each of the inner wall of the housing 10 and the outer surface of the rotary shaft 14 and the electrode unit 40 is patterned even in the electrification sheet 20. Therefore, the electric energy is generated in each electrode unit 40 through the multiple outputs by one input (pulling).

Next, hereinafter, a result of performing experiment by means of the energy harvesting apparatus using the triboelectrification, which has the aforementioned structure will be described.

Figure 8:
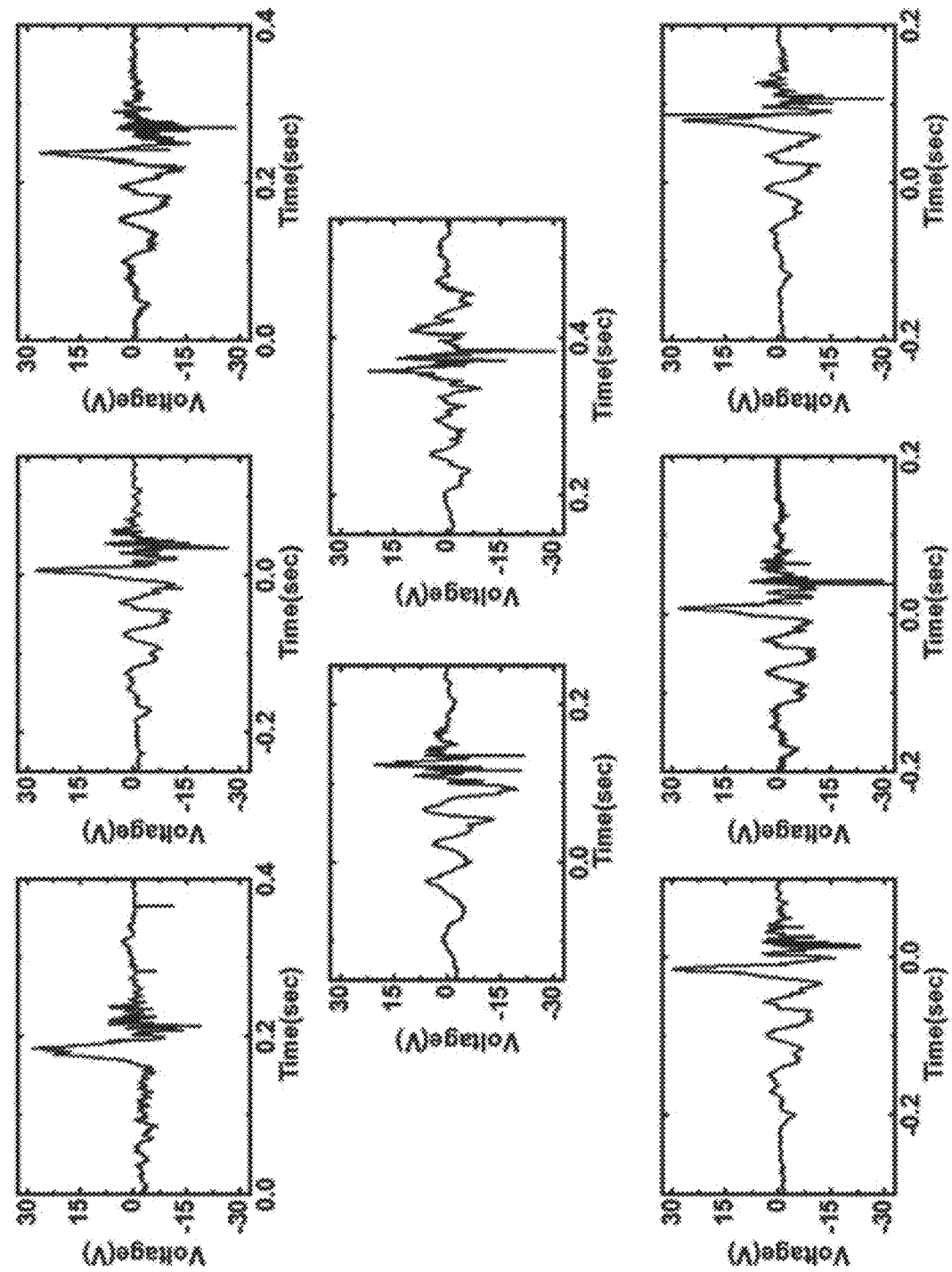
FIG. 8 is a graph showing various output results of the energy harvesting apparatus using the triboelectrification.

FIG. 8 is a graph showing various output results of the energy harvesting apparatus using the triboelectrification. Referring to the graph, an output range of the voltage measured for every experiment varies between 0 to 25 V as seen in FIG. 8, but it can be seen that shapes of all waveforms of the measured voltage are similar to each other. Therefore, a principle according to various output results is found through analysis of the waveform and analysis of a factor influencing the output and an experiment of output enhancement are performed.

Figure 9:
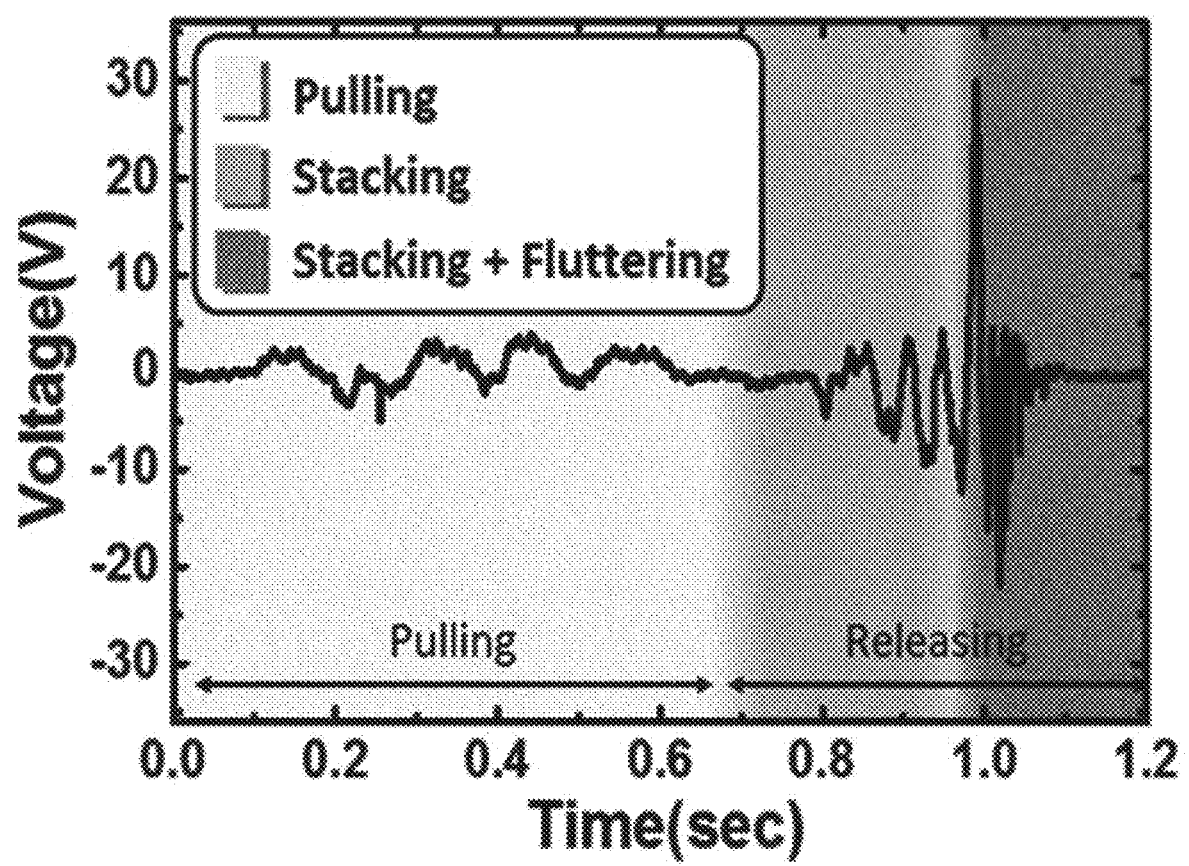
FIG. 9 is an electric output graph depending on motion change of an electrification sheet.

FIG. 9 is an electric output graph depending on motion change of an electrification sheet.

Referring to the electric output graph, in order to find the principle according to various output results, the voltage is measured by setting a period from a moment when the electrification sheet 20 is pulled to a moment when the electrification sheet 20 is released and thereafter, rolled as one cycle. As seen in FIG. 9, the waveform may be divided into three parts.

First, a pulling section in which when the electrification sheet 20 is pulled between 0 to 0.6 seconds, the voltage is measured in an alternating current type and a releasing section by motion generated while the electrification sheet 20 is rolled when the electrification sheet 20 is released after the pulling section are provided. In the releasing section, the electrification sheet 20 is rolled by elastic energy stored in the elastic body 30 by the rotary shaft 14 and AC electric energy is generated as the potential difference occurs while the electrification sheet 20 is overlapped while being rolled between 0.7 to 0.95 seconds and larger AC electric energy may be generated while the electrification sheet 20 is fluttered and rolled between 1.0 to 1.2 seconds.

Figure 10:
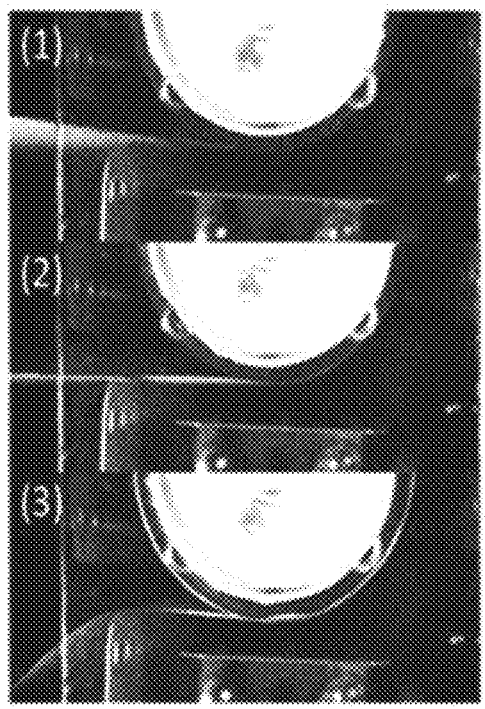
FIG. 10 is a high-speed photograph for motion analysis of the electrification sheet.
Figure 10:
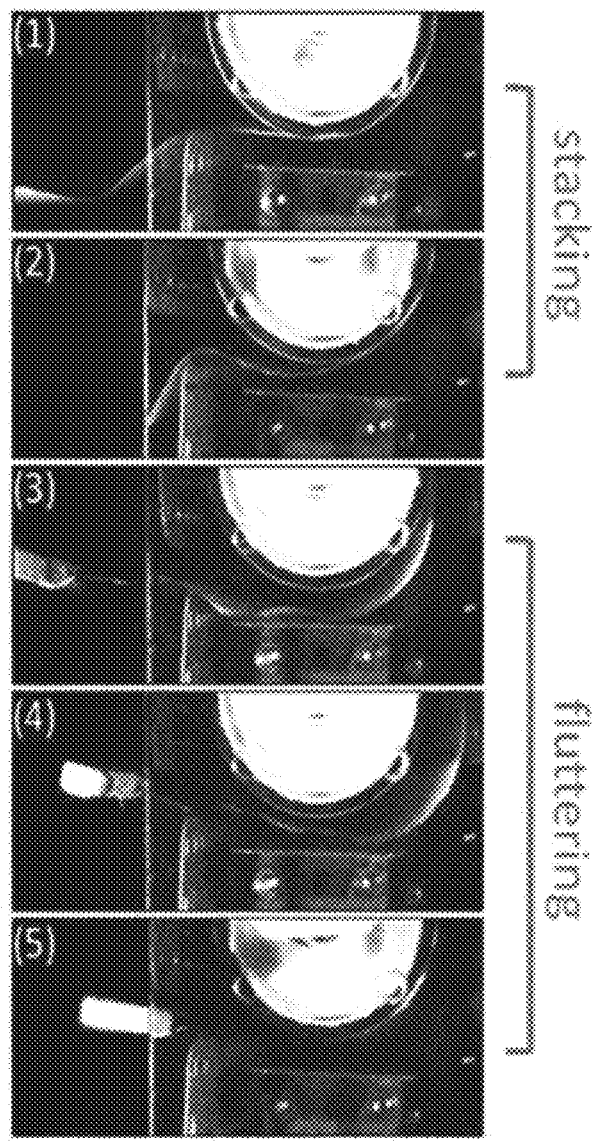

FIG. 10 is a high-speed photograph for motion analysis of the electrification sheet.

Referring to the high-speed photograph, since loads are applied to both sides of the electrification sheet 20 in a pulling motion as illustrate din FIG. 10(a), it can be seen that the movement of the electrification sheet 20 is limited and the electrification sheet 20 thus rotates while being attached to the rotary shaft 14. Thereafter, when the electrification sheet 20 is laid, two movements may be seen in a releasing motion in which the electrification sheet 20 is rolled as illustrated in FIG. 10(b).

In an initial stage, in a stacking ((b)-(1),(2)) phenomenon in which the rotary shaft 14 rotates by the elastic energy and the rotary shaft 14 moves while the electrification sheet 20 attached to the rotary shaft 14 stops and the electrification sheet 20 is rolled while being attached to the rotary shaft 14 and in a stacking+fluttering ((b)-(3),(4),(5)) phenomenon in which a motion speed of the electrification sheet 20 rolled at the time when the electric energy is almost consumed thereafter, which is higher than a rotary speed of the rotary shaft 14 by the inertial law and the electrification sheet 20 is fluttered inside may be seen and in this case, the voltage rapidly increases by high-speed vertical contact and separation and sliding as illustrated in FIG. 9.

As such, in the initial stages of the pulling section and the releasing section, a relative distance change between the electrification sheet 20 and the electrode unit 40 does not occur, but the electric energy depending on the overlapping influence which occurs while the pulled electrification sheet 20 is rolled is generated. In order to determine, compare, and analyze the degree depending on the influence of the overlapping, a program simulation and an experiment are performed as illustrated in FIGS. 11 and 12.

Figure 11:
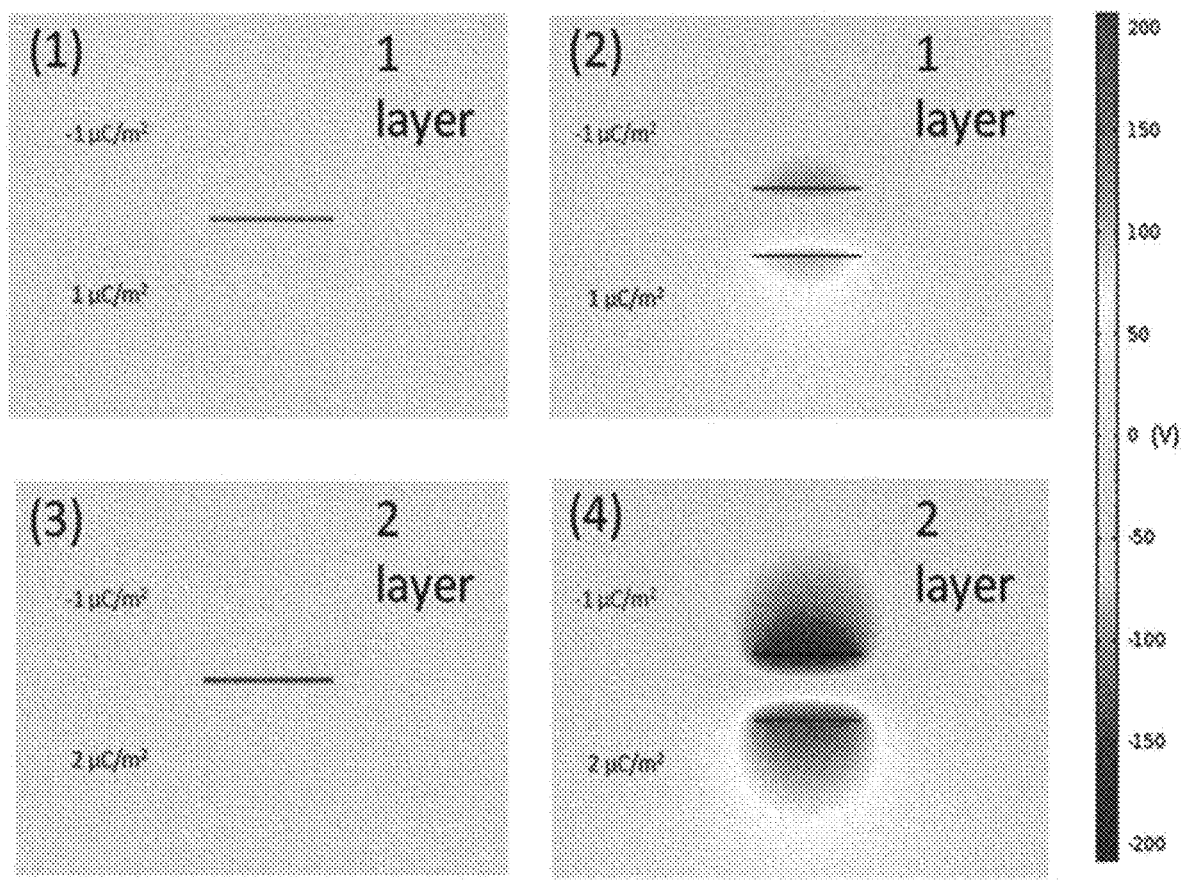
FIG. 11 illustrates a simulation result for determining an influence of overlapping of the electrification sheet.

FIG. 11 illustrates a simulation result for determining an influence of overlapping of the electrification sheet.

In order to determine the influence of the overlapping, first, it is determined whether a harvest amount of the electric energy is changed depending on a change in the number of layers of a material which is easily electrificated to a virtual negative (−) pole and a material in which the potential difference is easily electrificated to the negative (−) pole in vertical contact and separation of a virtual electrode unit 40 in the simulation program. In order to adjust the electrical equivalence, when the electrification sheet 20 is configured by one layer, a surface charge amount of the material which is easily electrificated is set to −1 μC/m² and the surface charge amount of the electrode unit 40 is set to 1 μC/m². When the electrification sheet 20 is configured by two layers, the surface charge amount of the electrode unit 40 is modified and set to 2 μC/m² in order to adjust the electrical equivalence similarly thereto. Processes (1) and (2) of FIG. 12 show the potential difference which occurs by contacting and separating one layer of material which is easily electrificated with and from the electrode unit 40 and processes (3) and (4) show the potential difference which occurs by contacting and separating two layers of materials which are easily electrificated with and from the electrode unit 40. As illustrated in the above drawings, it may be determined that a larger difference in the processes (1) and (2) occurs than the processes (3) and (4).

Figure 12:
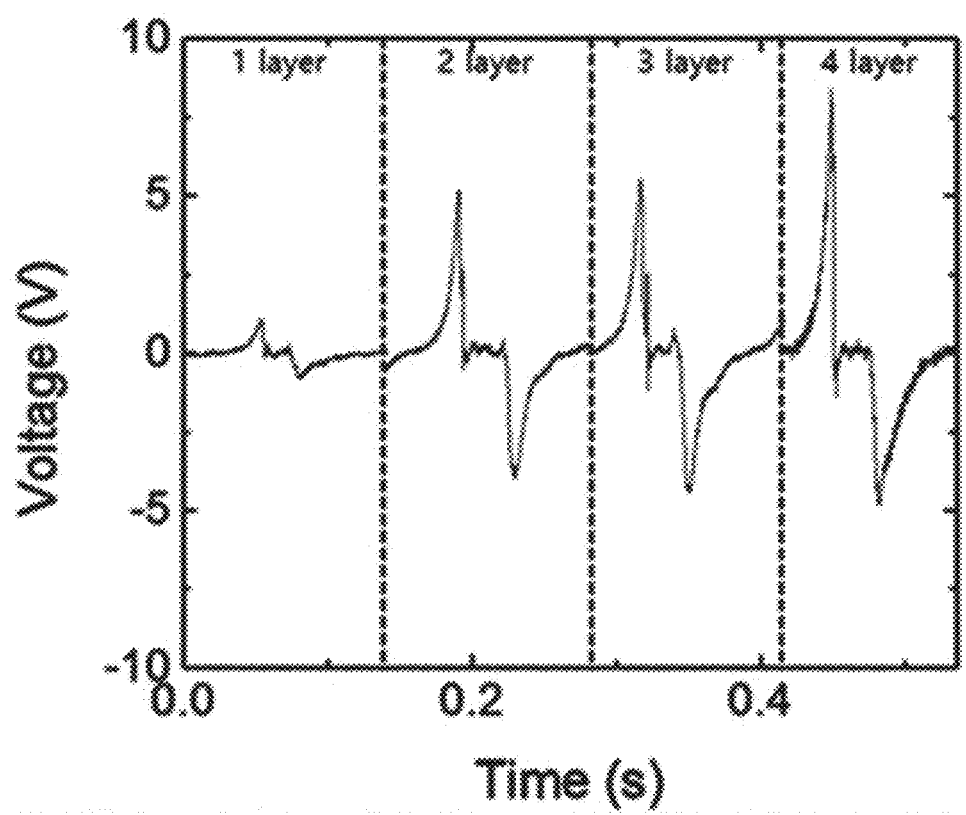
FIG. 12 is a graph showing output change depending on the number of stacked electrification sheets.

FIG. 12 is a graph showing output change depending on the number of stacked electrification sheets.

Referring to the graph, the voltage depending on the triboelectrification effect is measured by a scheme in which each surface of the electrification sheet 20 which is easily electrificated to the negative (−) pole is electrificated and thereafter, the electrification sheets 20 overlap with each other by differentiating the number of layers and thereafter, the electrification sheets 20 are vertically contacted and separated through a shaker in a single electrode type.

As an experiment result, a tendency in which the measured voltage increases as the number of layers of the electrification sheet 20 increases may be seen. The reason is that as the electrification sheets 20 which are relatively electrificated to the negative (−) pole overlap with each other, the resulting surface electrification charge amounts overlap with each other and while the degree of the electrostatic induction effect applied to an electrode increases, the resulting potential difference increases.

Figure 13:
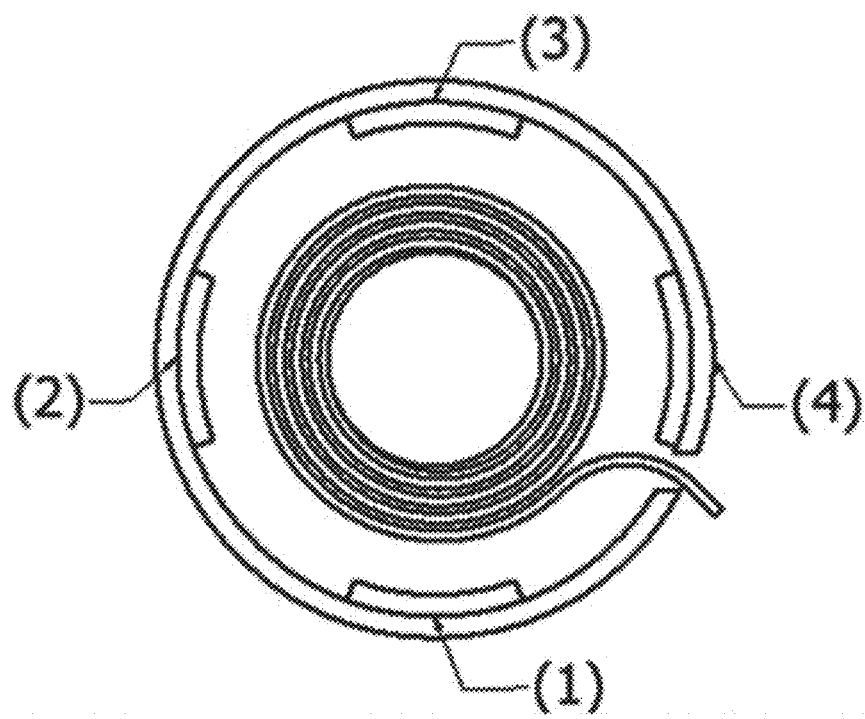
FIG. 13 is a graph showing voltage and current depending on a location of an internal electrode unit.
Figure 13:
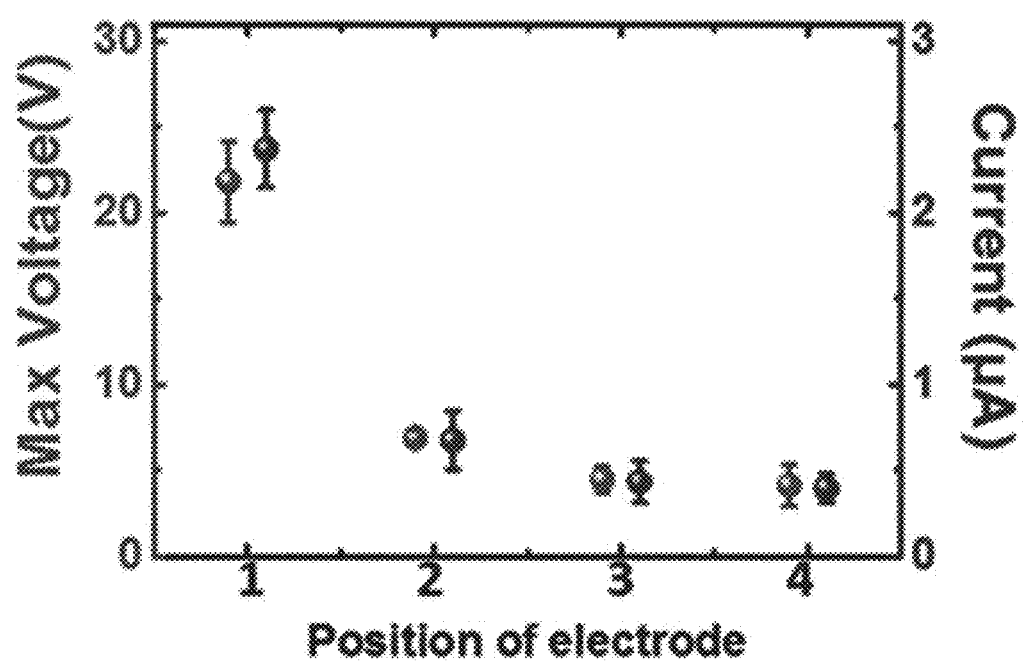

FIG. 13 is a graph showing voltage and current depending on a location of an internal electrode unit.

The above results as a most basic type of energy harvesting apparatus may enhance performed according to whether the electrode unit 40 and the electrification sheet 20 are patterned. First, multiple electrode units 40 are attached into the energy harvesting apparatus to measure an electrical output depending on the location and the measured electrical output is illustrated in FIG. 13.

As seen in FIG. 13, the electric energy may be harvested in the entirety of the inside of the energy harvesting apparatus and the electrode unit 40 at location #(1) shows a high voltage value with the contact and separation, and sliding motions of the electrification sheet 20 with the electrode unit 40 due to fluttering of the electrification sheet 20. Further, it can be seen that the fluttering of the electrification sheet 20 influences even the electrode unit 40 at location #(2) to some degree. The electrode units 40 at locations #(3) and #(4) are relatively distant from the electrification sheet 20 so as for the fluttering of the electrification sheet 20 to influence the corresponding electrode units 40, and as a result, most electric energy is harvested according to the overlapping principle. Therefore, when the electric energy is harvested by the energy harvesting apparatus, the electric energy may be produced even at any place in the energy harvesting apparatus and the places are connected to enhance efficiency.

Figure 14:
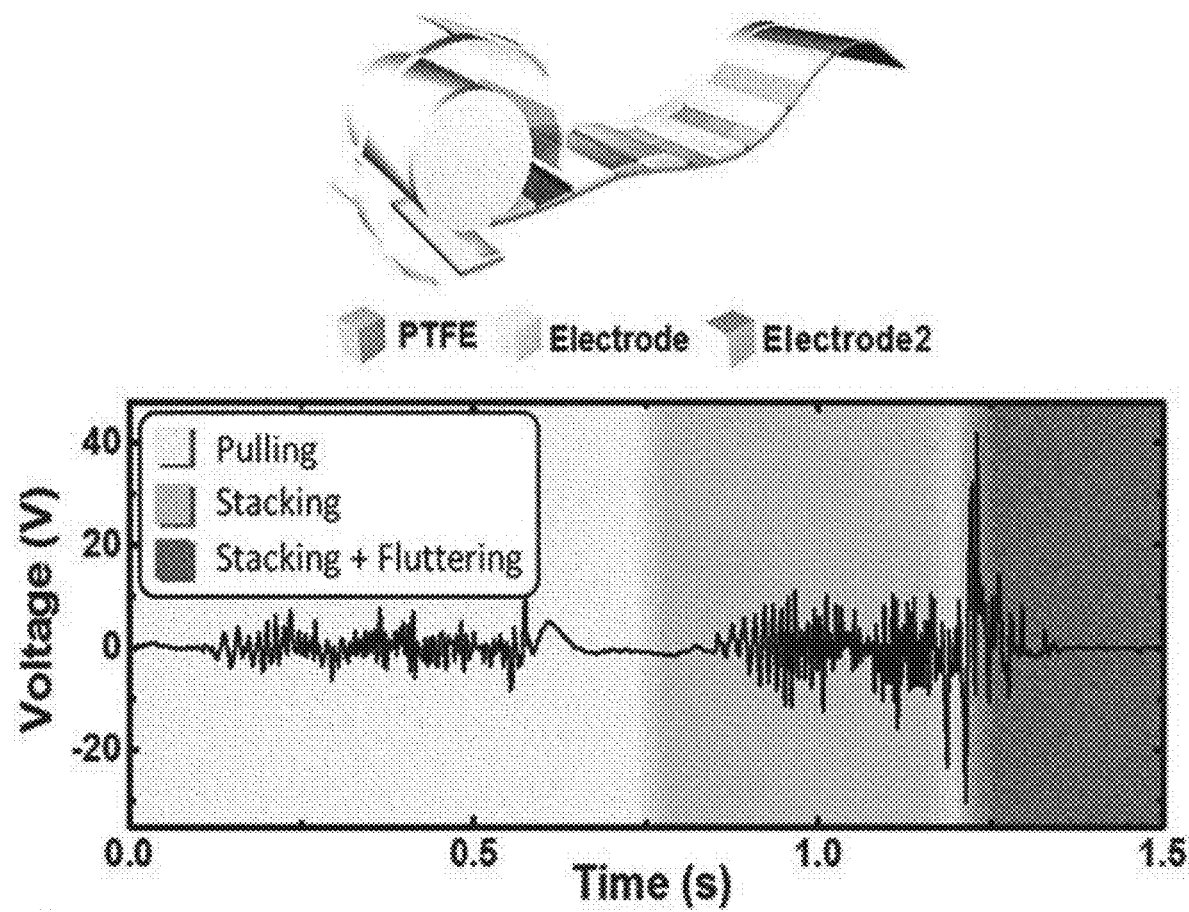
FIG. 14 is a graph showing that a harvest amount of electric energy is enhanced through patterning of an electrode unit.

FIG. 14 is a graph showing that a harvest amount of electric energy is enhanced through patterning of an electrode unit.

Referring to the graph, the harvest amount of the electric energy harvested through patterning of the electrode unit 40 in the electrification material may be increased. In the basic type, the electric energy is harvested only by the overlapping effect except for a section in which the electrification sheet 20 performs the fluttering motion in the energy harvesting apparatus. However, when the electrode units 40 are patterned in the electrification material and connected with the inside, the electrification material and the electrode unit 40 alternately pass through the above part of the electrode unit 40, and as a result, more AC electric energy may be generated due to the triboelectrification effect.

The present invention has been described with reference to specific embodiments. However, it will be appreciated by those skilled in the art that various modifications and changes of the present invention can be made without departing from the spirit and the scope of the present invention which are defined in the appended claims and their equivalents.

The invention claimed is:

1. An energy harvesting apparatus using triboelectrification, the apparatus comprising:
    a housing formed in a substantially cylindrical shape having an opening on a side;
    an electrification sheet rolled in multiple layers around a rotary shaft arranged in the housing, and configured to be unrolled by external force pulling the electrification sheet out of the housing through the opening;
    an elastic body provided in the housing and configured to apply elastic force to roll back the electrification sheet against the external force; and
    an electrode provided on the electrification sheet or in the housing such that the electrification sheet is electrified by triboelectrification by contact with the electrode while being unrolled or rolled.

2. The energy harvesting apparatus using triboelectrification of claim 1, wherein the rotary shaft is connected to the electrification sheet.

3. The energy harvesting apparatus using triboelectrification of claim 2, wherein the electrode is provided on an outer surface of the rotary shaft.

4. The energy harvesting apparatus using triboelectrification of claim 2, wherein the electrode is provided on an inner wall of the housing and an outer surface of the rotary shaft.

5. The energy harvesting apparatus using triboelectrification of claim 1, wherein a grip portion having a larger thickness than the electrification sheet is formed at a front end of the electrification sheet.

6. The energy harvesting apparatus using triboelectrification of claim 1, wherein the electrification sheet comprises a polytetrafluoroethylene material.

7. The energy harvesting apparatus using triboelectrification of claim 1, wherein the electrode is provided on an inner wall of the housing.

8. The energy harvesting apparatus using triboelectrification of claim 1, wherein the electrode comprises a pattern formed in the electrification sheet.

\* \* \* \* \*